March 7, 1933. R. F. KOHR 1,899,967
BRAKE
Original Filed June 23, 1927
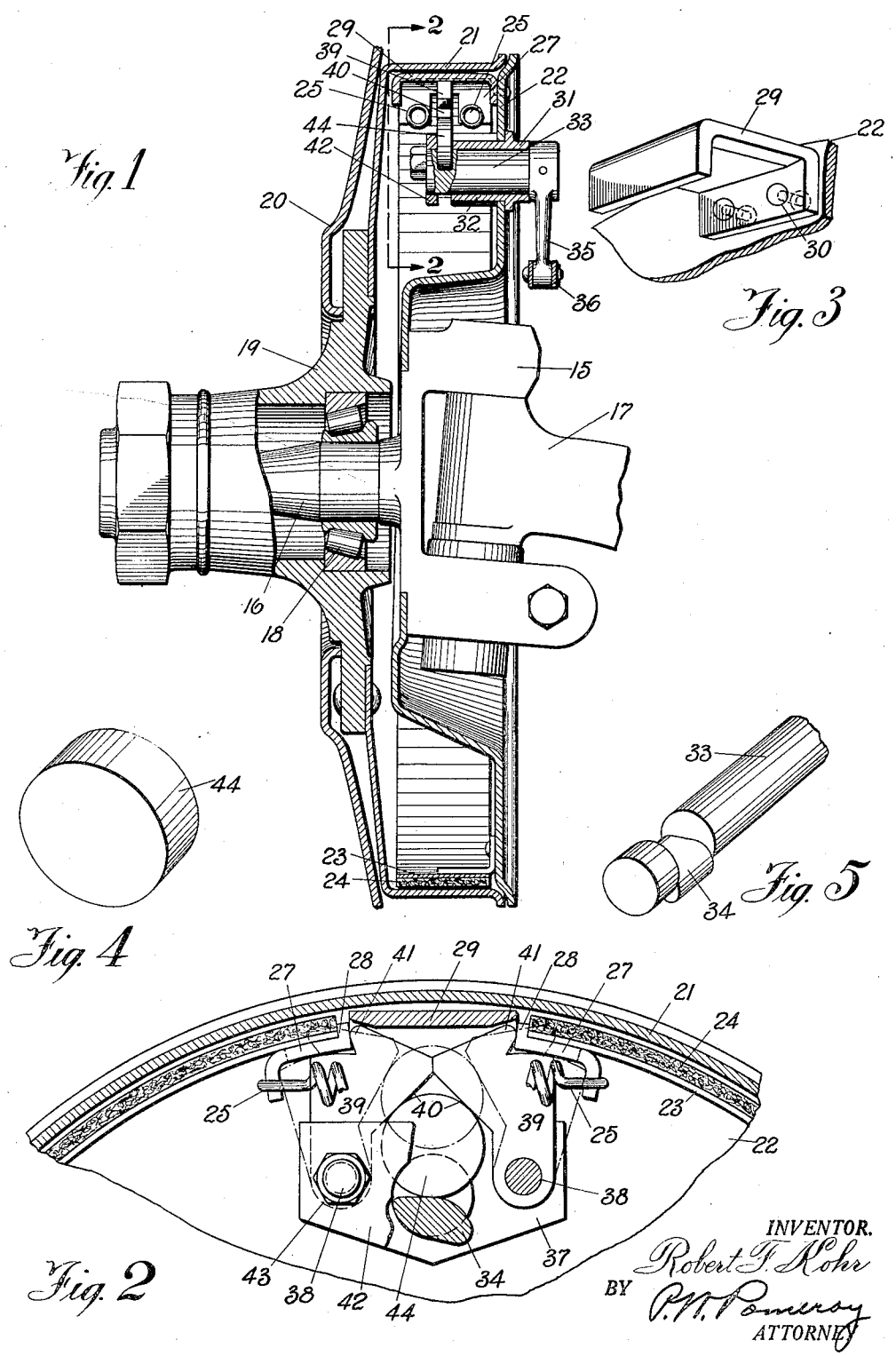

Patented Mar. 7, 1933

1,899,967

UNITED STATES PATENT OFFICE

ROBERT F. KOHR, OF SOUTH BEND, INDIANA, ASSIGNOR TO THE STUDEBAKER CORPORATION, OF SOUTH BEND, INDIANA, A CORPORATION OF NEW JERSEY

BRAKE

Original application filed June 23, 1927, Serial No. 200,944. Divided and this application filed May 3, 1929. Serial No. 360,123.

This invention relates to vehicle brakes and particularly to the operating mechanism therefor and is a division of my copending application, Serial No. 200,944 filed June 23, 1927.

The principal object of the present invention is to provide a vehicle brake with an operating mechanism which will engage the brake with the brake drum as effectively when the drum is rotating in a clockwise direction as when it is rotating in a counter-clockwise direction.

Another object is to provide a vehicle brake with a brake operating mechanism which will expand the brake into engagement with the brake drum in a direction circumferentially of the drum.

Another object is to provide a vehicle brake with an operating mechanism which engages the brake element substantially in the circular path thereof for expanding the brake element in a circumferential direction into engagement with the rotating brake drum.

Another object is to provide a vehicle brake with operating means comprising a pair of pivoted levers and a free floating cylinder engaging both levers for moving the same to expand the brake element into friction engagement with the brake drum.

A further object is to provide a vehicle brake with an operating mechanism comprising a pair of pivotal levers engaging the ends of the brake element substantially in the circular path thereof, a free floating cylinder engageable with both levers, and an eccentric for moving the cylinder radially outwardly to pivot the levers to expand the brake element into frictional engagement with the brake drum.

A further object is to provide a vehicle brake with an operating mechanism comprising a pair of pivoted levers engaging the ends of the brake element substantially in the circular path thereof, a free floating cylinder engageable with both levers, and an eccentric for moving the cylinder radially outwardly to pivot the levers to expand the band in a circumferential direction into frictional engagement with the brake drum.

These being among the objects of the present invention, the same consists of certain features of construction and combination of parts to be hereinafter described with reference to the accompanying drawing, and then claimed, having the above and other objects in view.

In the drawing which illustrates a suitable embodiment of the present invention, Figure 1 is a vertical transverse section taken through the left front wheel of a motor vehicle showing the brake operating mechanism.

Figure 2 is a fragmentary sectional view taken on the line 2—2 of Figure 1, more clearly showing the brake expanding mechanism.

Figure 3 is a perspective view of a portion of the dust cover and the stop member mounted thereon.

Figure 4 is a perspective view of the lever operating cylinder.

Figure 5 is a perspective view of the cam for operating the cylinder.

Referring to the accompanying drawing in which like numerals refer to like parts throughout the several views, a conventional steering knuckle 15 having a stub axle 16 formed thereon is pivoted to a front axle 17. Mounted on the stub axle 16 is a bearing 18 which supports the rotatable wheel hub 19 on which the vehicle wheel 20 and the brake drum 21 are concentrically arranged and secured. A brake drum dust cover 22 is secured to the steering knuckle 15 adjacent to the brake drum 21 to provide a support for the brake mechanism.

As shown in Figure 2, a thin section steel brake band 23 faced with a suitable friction material 24 is concentrically arranged within the brake drum 21 and is normally held in spaced relationship therefrom by a pair of coil springs 25 which tend to draw the ends of the same inwardly toward each other. The ends of the springs 25 are hooked through the depending portions of Z-shaped brackets 27 secured to the extreme ends of the band 23.

The coil springs 25 as just mentioned contract the band 23 and draw the ends of the same toward each other until the ends 28 of the Z-shaped brackets 27 abut against the operating levers to be hereinafter described positioned within the side walls of a U-shaped stop member 29 secured to the dust cover 22 by the rivets 30.

Suitably secured to the outer side of the dust cover 22 is a support 31 having an inwardly extending tubular portion 32 adapted to rotatably receive an operating shaft 33 having a cam 34 thereon as is clearly shown in perspective in Figure 5. The shaft 33 has a lever 35 secured at its outer end which has a brake rod 36 pivoted thereto and connected with some source of braking pressure such as a conventional brake pedal, not shown.

A support 37 secured to the dust cover 22 has mounted thereon two pins 38. The pins 38 support two pivoted levers 39 having inclined faces 40 and lips 41 which engage the ends 28 of the Z-shaped brackets 27 directly in the circular path of the band 23. A plate 42 which is retained on the pins 38 by nuts 43 holds the levers 39 against the support 37 to prevent transverse movement of the same. A cylindrical roller 44 is positioned between the support 37 and the plate 42 and is guided therebetween when it is moved radially outwardly by the rotatable cam 34 to contact with the inclined faces 40 of the levers 39.

In normal inoperative position as shown in Figure 2 the levers 39 contact with each other to act as stops for the end of the band 23 but in operative position as shown in dash and dotted outline in Figure 2, one end of the band 23, depending upon the direction of rotation of the drum 21, is held against rotation by the U-shaped stop 29 interposed between the ends of the band 23.

Movement of the cylinder 44 against the inclined faces 40 of the levers 39 forces the levers 39 to rotate in opposite directions about their pivot pins 38 against the tension of the springs 25 and expands the band 23 into engagement with the drum 21.

At the instant the friction facing 24 engages the drum 21 the band 23 rotates with the drum 21 until the right hand end of the band (when the brake drum is rotating in a counter-clockwise direction) abuts against the right side of the stop 29. This causes both levers 39 to rotate in a counter-clockwise direction and further radial movement of the cam 34 causes the cylinder 44 to pivot the left lever 39 and rotate the same in a counter-clockwise direction to expand the band 23 in a circumferential direction into further frictional engagement with the drum 21 to retard the rotation thereof, the right lever 39 being held against rotation on movement of the cylinder 44 by the resistance of the right hand end of the band 23 to expand in a clockwise direction. The brake mechanism works in the same manner when the brake drum 21 is rotating in a clockwise direction with the exception that the left hand end of the band 23 engages with the left side of the stop 29 and the right end of the band 23 is moved for expansion. It can be seen that the band 23 will be expanded into engagement with the drum 21 in a circumferential direction because each of the levers 39 contacts with the ends 28 of the Z-shaped brackets 27 on lines approximately in the circular path of the band 23.

It will thus be seen that the maximum efficiency of an internal expanding band brake is obtained in the present invention by expanding the band in a circumferential direction by exerting pressure against the ends of the same substantially in the circular path thereof.

It is to be understood that the present invention is not limited to the particular shapes of the operating levers shown or other details of construction but that formal changes may be made in the specific embodiment of the invention described without departing from the spirit and substance of the broad invention the scope of which is commensurate with the appended claims.

What I claim is:

1. In a brake mechanism, a rotatable drum, braking means movable to engage said drum, an actuating means therefor comprising a pair of pivoted levers engaging the ends of said braking means substantially in the circular path thereof, a free floating cylinder positioned between said levers and contacting therewith, and a rotatable cam for moving said cylinder outwardly to pivot one or both of said levers for engaging said braking means with said drum.

2. In a brake mechanism, a rotatable drum, braking means movable to engage said drum, a pair of levers having inclined faces intermediate their ends engageable with said braking means, and a free floating cylinder engaging said inclined faces for actuating one or both of said levers to move said braking means into engagement with said drum.

3. In a brake mechanism, a rotatable drum, braking means movable to engage said drum, a pair of levers engageable with said braking means, stops on said levers cooperating to limit the contraction of said braking means, and free floating means engaging said levers for actuating one or both of said levers to move said braking means into engagement with said drum.

4. In a brake mechanism, a rotatable drum, braking means movable to engage said drum, a pair of levers engageable with said braking means, said levers normally engaging each other to limit the contraction of said braking means, and free floating means engaging said levers for actuating one or both of said levers to move said braking means into engagement with said drum.

5. In a brake mechanism, a rotatable drum, braking means movable to engage said drum, a pair of levers engageable with said braking means, said levers having inclined faces terminating in stops whereby said levers normally engage each other to limit the contraction of said braking means, and a free floating cylinder engaging said inclined faces for actuating one or both of said levers to move said braking means into engagement with said drum.

6. In a brake mechanism, a rotatable drum, braking means movable to engage said drum, pivoted levers engaging said braking means and normally engaging each other, a free floating member engaging said levers, and a rotatable cam for moving said free floating member to move said levers out of engagement with each other and to engage said braking means with said drum.

7. In a brake mechanism, a rotatable drum, braking means engageable therewith, pivoted levers engaging said braking means and normally engaging each other, and means movable radially of said drum for moving said levers out of engagement with each other and to engage said braking means with said drum.

8. In a brake mechanism, a rotatable drum, braking means engageable therewith, levers provided with spaced pivots engaging said braking means, at least one of said levers having an inclined face, and free floating means movable radially of said drum and guided solely by said levers for moving one or both of said levers to engage said braking means with said drum.

9. In a brake mechanism, a rotatable drum, braking means engageable therewith, and pivoted levers engageable with said braking means for moving the same into engagement with said drum, said levers cooperating to provide a stop for said braking means to limit the contraction thereof.

10. In a brake mechanism, a rotatable drum, a brake band engageable therewith, pivoted levers engageable with said braking means for moving the same into engagement with said drum, said levers cooperating to provide a stop for said brake band to limit the contraction thereof, and stop means for limiting the circumferential movement of one end of said band when the same is moved into engagement with said drum.

11. In a brake mechanism, a rotatable drum, braking means engageable therewith, pivoted levers engageable with said braking means for moving the same into engagement with said drum, free floating means between said levers, and a cam for urging said means outwardly radially of said drum to separate said levers to expand said braking means, said free floating means being guided tangentially by said levers to equalize any unbalanced forces between said levers.

12. In a brake mechanism, a rotatable drum, a brake band engageable therewith, a pair of pivoted levers engageable with said brake band, free floating means between said levers for forcing them apart to expand said brake band, said levers being formed with cooperating stop means to limit the contraction of said brake band, and stop means for limiting the circumferential movement of one end of said band when said band is moved into engagement with said drum.

Signed by me at South Bend, Indiana, this 1st day of May, 1929.

ROBERT F. KOHR.

CERTIFICATE OF CORRECTION.

Patent No. 1,899,967.　　　　　　　　　　　　　　　March 7, 1933.

ROBERT F. KOHR.

It is hereby certified that error appears in the printed specification of the above numbered patent requiring correction as follows: Page 3, beginning with line 34 strike out all to and including line 50, comprising claims 9 and 10; same page, lines 51 and 62, for the claim numerals "11 and 12" read "9 and 10" respectively; and that the said Letters Patent should be read with these corrections therein that the same may conform to the record of the case in the Patent Office.

Signed and sealed this 11th day of April, A. D. 1933.

M. J. Moore.
Acting Commissioner of Patents.

(Seal)